United States Patent
Cook

(10) Patent No.: US 11,262,480 B2
(45) Date of Patent: Mar. 1, 2022

(54) METHODS AND APPARATUS FOR REDUCING SPECULAR RETURN FROM WIDE FIELD-OF-VIEW REFRACTIVE OPTICS

(71) Applicant: RAYTHEON COMPANY, Waltham, MA (US)

(72) Inventor: Lacy G. Cook, El Segundo, CA (US)

(73) Assignee: RAYTHEON COMPANY, Waltham, MA (US)

(*) Notice: Subject to any disclaimer, the term of this patent is extended or adjusted under 35 U.S.C. 154(b) by 356 days.

(21) Appl. No.: 16/444,079

(22) Filed: Jun. 18, 2019

(65) Prior Publication Data
US 2020/0400859 A1 Dec. 24, 2020

(51) Int. Cl.
*G02B 1/11* (2015.01)
*G02B 5/00* (2006.01)

(52) U.S. Cl.
CPC .............. *G02B 1/11* (2013.01); *G02B 5/003* (2013.01)

(58) Field of Classification Search
CPC ...... H04N 5/247; H04N 5/265; H04N 5/2253; H04N 5/2254; H04N 5/2624; H04N 5/23238; H04N 5/3415; H04N 5/3572; G02B 1/11; G02B 5/003; G02B 23/14; G02B 27/0018; G02B 1/041; G02B 5/005; G02B 5/09; G02B 5/3083; G02B 27/0025; G02B 27/0062; G02B 27/0027; G02B 27/1013; G02B 27/4211; G06T 5/003; G06T 3/4069; G06T 5/002; G06T 5/006; G06T 5/30; G06T 5/50; G06T 3/003;
(Continued)

(56) References Cited

U.S. PATENT DOCUMENTS

| 6,862,147 | B1 | 3/2005 | Sonstroem |
| 2010/0044555 | A1* | 2/2010 | Ohara ............... G02B 27/0075 250/216 |
| 2015/0028188 | A1 | 1/2015 | Kowalevicz et al. |

(Continued)

FOREIGN PATENT DOCUMENTS

| EP | 0639783 A1 | 2/1995 |
| WO | 03003097 A1 | 1/2003 |

OTHER PUBLICATIONS

International Search Report and Written Opinion in International Patent Application No. PCT/US2020/035685 dated Sep. 11, 2020.

*Primary Examiner* — Sultan Chowdhury
(74) *Attorney, Agent, or Firm* — Lando & Anastasi, LLP

(57) ABSTRACT

An optical imaging system including refractive optics and a blocking component. The refractive optical having an entrance aperture and configured to receive optical radiation via an operational aperture, to focus the optical radiation onto a focal plane to form a telecentric image plane co-located with the focal plane, the operational aperture being co-located with the entrance aperture, having a diameter less than half a diameter of the entrance aperture, and being offset from a primary optical axis that bisects the entrance aperture by at least a radius of the entrance aperture, and a blocking component located at the entrance aperture on an opposite side of the primary optical axis from the operational aperture. The blocking component being configured to block the optical radiation from exiting the refractive optics via a region of the entrance aperture where the blocking component is located.

13 Claims, 4 Drawing Sheets

(58) Field of Classification Search
CPC ....... G06T 3/0018; G06T 3/0031; G06T 3/20; G06T 3/40; G06T 5/4053; G06T 3/4084
See application file for complete search history.

(56) References Cited

U.S. PATENT DOCUMENTS

| | | | | |
|---|---|---|---|---|
| 2017/0192213 A1* | 7/2017 | Theriault | ........... | G02B 17/0631 |
| 2017/0254999 A1* | 9/2017 | Brady | .................... | H04N 5/247 |
| 2017/0287118 A1* | 10/2017 | Crowe | ....................... | G01J 9/00 |
| 2018/0224642 A1* | 8/2018 | Cook | .................... | G02B 23/06 |

\* cited by examiner

METHODS AND APPARATUS FOR REDUCING SPECULAR RETURN FROM WIDE FIELD-OF-VIEW REFRACTIVE OPTICS

BACKGROUND

Two-dimensional wide field-of-view imagers are typically refractive, and refractive imagers generally have a strong specular return, or retro-reflection, from the imaging sensor (usually a focal plane array (FPA)) over much or all of the field of view. FIG. 1 illustrates an example of a refractive imager 100. The refractive imager 100 includes optics 110 composed of a plurality of refractive optical components (six lenses in the illustrated example) configured to receive incident optical radiation 120 via an entrance pupil 130 (arrow 125 indicating the incoming direction of the optical radiation 120) and focus the optical radiation 120 onto an image plane, or focal plane, 140 where an imaging sensor is located. The example of the imager 100 shown in FIG. 1 receives a collimated input at the entrance pupil 130 of the optics 110 and produces a telecentric or near telecentric image (i.e., the ray cones of the optical radiation 120 are normal to the focal plane 140) at the focal plane 140. Specular reflections from the imaging sensor, indicated by arrow 145, return back out the entrance pupil 130 over much, most, or all of the field of view. Under certain circumstances, this specular return creates a bright light source, or "cat's eye" effect, that can be easily detected and may be used by an adversary to accurately locate the imager 100.

For one-dimensional or line field-of-view imagers, there are various known methods for eliminating this return (sometimes referred to as the retro-reflection). However, there is no known practical way to eliminate this return for two-dimensional wide field-of-view refractive optics that is not detrimental to either or both the imager transmission or image quality. For example, sometimes multiple thin wedges are located close to the imaging sensor in an attempt to eliminate the specular return from the sensor. However, the effectiveness of the multiple wedges is greatly reduced as the field of view becomes large and two-dimensional or when the optical speed is very fast. In addition, there are often image quality and distortion drawbacks associated with the wedge solution. Further, in a cold Dewar, as in used for many thermal imaging applications, the wedges are costly and may move, causing distortion, loss of imaging performance and/or loss of effectiveness in blocking the return.

SUMMARY OF INVENTION

As discussed above, specular return, or retro-reflection, from an imaging sensor is highly undesirable as it creates a means by which the location of the imager can be easily and accurately determined. However, due to the lack of an adequate solution to the problem of retro-reflection, particularly in two-dimensional wide field-of-view imagers, the imaging sensor retro-reflection is often simply ignored or discounted as a problem. Aspects and embodiments are directed to an optical design that can be used in refractive imagers to eliminate the specular return from the imaging sensor, which may reduce the optical cross-section of the imager by as much as 1000 times or more, making it much more difficult to detect the imager or identify its location.

According to one embodiment, a refractive optical imaging system comprises refractive optics having an entrance aperture and configured to receive optical radiation via an operational aperture, to focus the optical radiation onto a focal plane to form a telecentric image plane co-located with the focal plane, the operational aperture being co-located with the entrance aperture, having a diameter less than half a diameter of the entrance aperture, and being offset from a primary optical axis that bisects the entrance aperture by at least a radius of the entrance aperture. The refractive optical imaging system further comprises an imaging detector disposed at the focal plane and configured to receive the optical radiation, and a blocking component located at the entrance aperture in a region of the entrance aperture not occupied the by the operational aperture, the blocking component being configured to absorb surface reflections from the imaging detector.

In one example, the blocking component is located on an opposite side of the primary optical axis from the operational aperture.

In another example, the blocking component includes an absorptive coating. The absorptive coating may be black paint, for example.

In one example, the refractive optics are corrected for aberrations over a field of view corresponding to the entrance aperture.

In another example, the blocking component is further configured to block the optical radiation from entering the refractive optics via the region of the entrance aperture where the blocking component is located.

In another example, the refractive optics are rotationally symmetric about the primary optical axis.

According to another embodiment, an optical imaging apparatus comprises refractive optics having an entrance aperture and configured to receive optical radiation via an operational aperture, to focus the optical radiation onto a focal plane to form a telecentric image plane co-located with the focal plane, the operational aperture being co-located with the entrance aperture, having a diameter less than half a diameter of the entrance aperture, and being offset from a primary optical axis that bisects the entrance aperture by at least a radius of the entrance aperture, the refractive optics being rotationally symmetric about the primary optical axis, and a blocking component located at the entrance aperture on an opposite side of the primary optical axis from the operational aperture, the blocking component being configured to block the optical radiation from exiting the refractive optics via a region of the entrance aperture where the blocking component is located.

In one example, the optical imaging apparatus further comprises an imaging detector located at the focal plane and configured to receive the optical radiation. The blocking component may be configured to block a specular return from the imaging detector from exiting the entrance aperture.

In one example, the blocking component includes an optically absorptive coating. In another example, the optically absorptive coating is black paint.

In another example, the refractive optics are corrected for aberrations over a field of view corresponding to the entrance aperture.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to an optical design of a two-dimensional wide field-of-view (WFOV) refractive imager that includes an optical design for greater than twice the required aperture for imaging, with the system configured to use only half the design aperture for actual imaging. The other half of the aperture may be used to entirely block any specular reflections from the imager focal plane array (FPA) as such reflections proceed back through the optical train.

Figure 1:
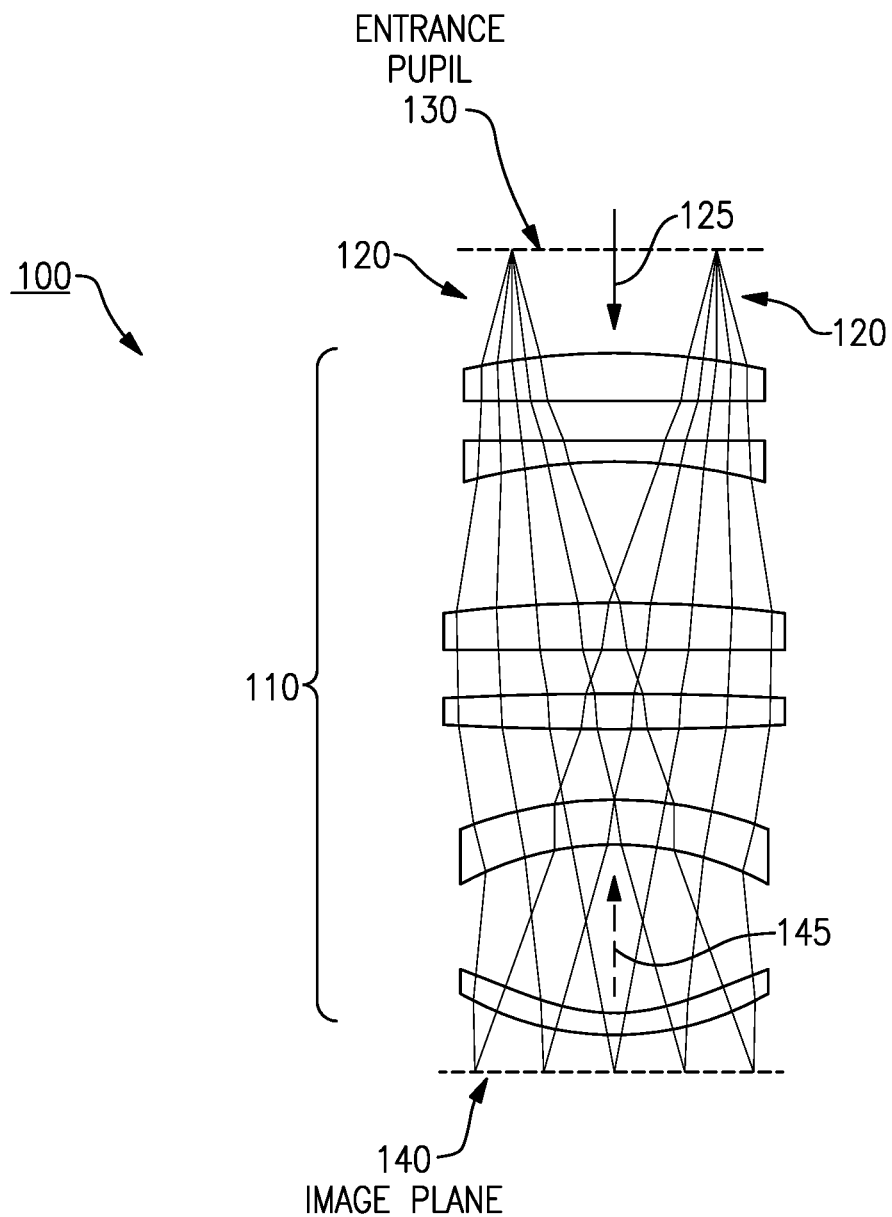
FIG. 1 is a ray trace of one example of a refractive imager demonstrating retro-reflection from the imaging sensor.
Figure 2:
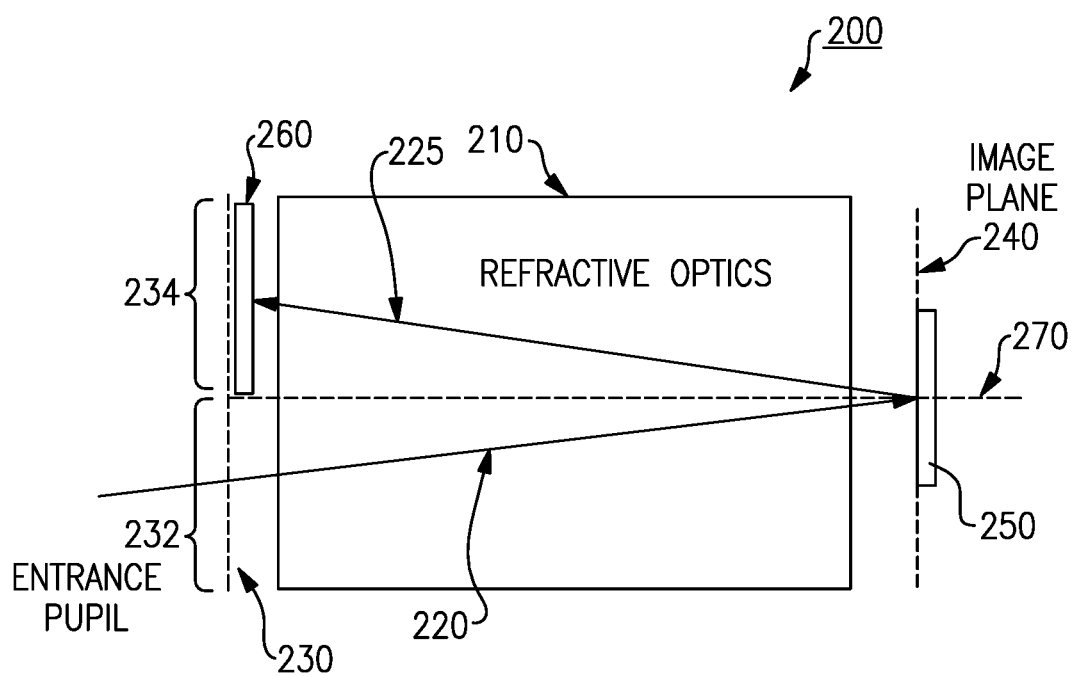
FIG. 2 is a block diagram of one example of a refractive imaging system according to aspects of the present invention.

Referring to FIG. 2, there is illustrated a block diagram of an example of an optical imaging system 200, demonstrating this concept. The optical imaging system 200 includes refractive optics 210 that are configured to receive incident optical radiation 220 via an entrance aperture 230 from a viewed scene and focus the optical radiation 230 onto a focal plane 240 at which an imaging detector 250, such as a focal plane array (FPA) sensor, is located. According to certain embodiments, the optical imaging system 200 has an operational aperture 232 having a diameter that is less than half the diameter of the complete entrance aperture 230 of optical imaging system 200. In other words, only the operational aperture 232 is used to receive the optical radiation 220 that is directed to the imaging detector 250 for producing an image of the viewed scene. A blocking component 260 is placed in the remaining portion 234 of the entrance aperture 230 to both block incident optical radiation 220 from being received by the refractive optics 210 from that region of the entrance aperture 230 and block a specular return 225 from the imaging detector 250, as discussed further below. The operational aperture 232 is offset from the overall (or "parent") primary optical axis 270 of the refractive optics 210. The primary parent optical axis 270 bisects the entrance aperture 230. In certain examples, the operational aperture 232 is located in one half of the entrance aperture 230 and the blocking component 260 being located in the other half 234, as shown in FIG. 2. In certain embodiments, the refractive optics 210 are rotationally symmetric about the parent primary optical axis 270, and the specular return (reflections) off the imaging detector 250 follow a path through the refractive optics 210 that closely mimics the path of the incoming optical radiation 220, but on the opposite side of the parent primary optical axis 270.

As discussed above, some of the optical radiation 220 incident on the imaging detector 250 is reflected as a specular return 225 from the imaging detector 250. Conventionally, this specular return 225 would exit the entrance aperture 230, potentially allowing the optical imaging system 200 to be detected. In contrast, the refractive optics 210 are configured such that the specular return 225 produced by the imaging detector 250 from the optical radiation 220 received via the operational aperture 232 is directed to the remaining portion 234 of the entrance aperture 230, where it is blocked from exit and absorbed by the blocking component 260. The blocking component 260 in an optically opaque element that may be painted black or have some other absorptive coating or be made from an optically absorptive material, such that the specular return 225 is absorbed by the blocking component 260 and not reflected back into the refractive optics 210. In this manner, the specular return 225 is prevented from exiting the entrance aperture 230, eliminating or greatly reducing the risk of detection of the optical imaging system 200 due to this reflection from the imaging detector 250.

Thus, aspects and embodiments provide a solution to greatly reduce or eliminate the specular return from an imaging detector in a refractive optical imaging system through the optical design. The optical form of the refractive optics 210 is not limited to any particular configuration, provided that the refractive optics 210 are well corrected for aberrations over at least twice the nominally required operational aperture 232 (in other words, the optical speed (F number) must be doubled) and configured to produce a telecentric image plane at the focal plane 240 (i.e., the nominal chief rays of the complete entrance aperture 230 are normal to the focal plane 240). In addition, as discussed above, the operational aperture 232 must be offset from the primary parent optical axis 270 by a distance larger than the radius of the operational aperture 232. Further, the blocking component 260 is located on the opposite side 234 of the parent primary optical axis 270 in the entrance aperture 230 to stop and absorb the surface reflections (specular return 225) from the imaging detector 250. For an optical imaging system 200 having these four combined design features, the specular surface reflections from the imaging detector 250 are eliminated everywhere in the two-dimensional wide field of view provided by the refractive optics 210.

Figure 3A:
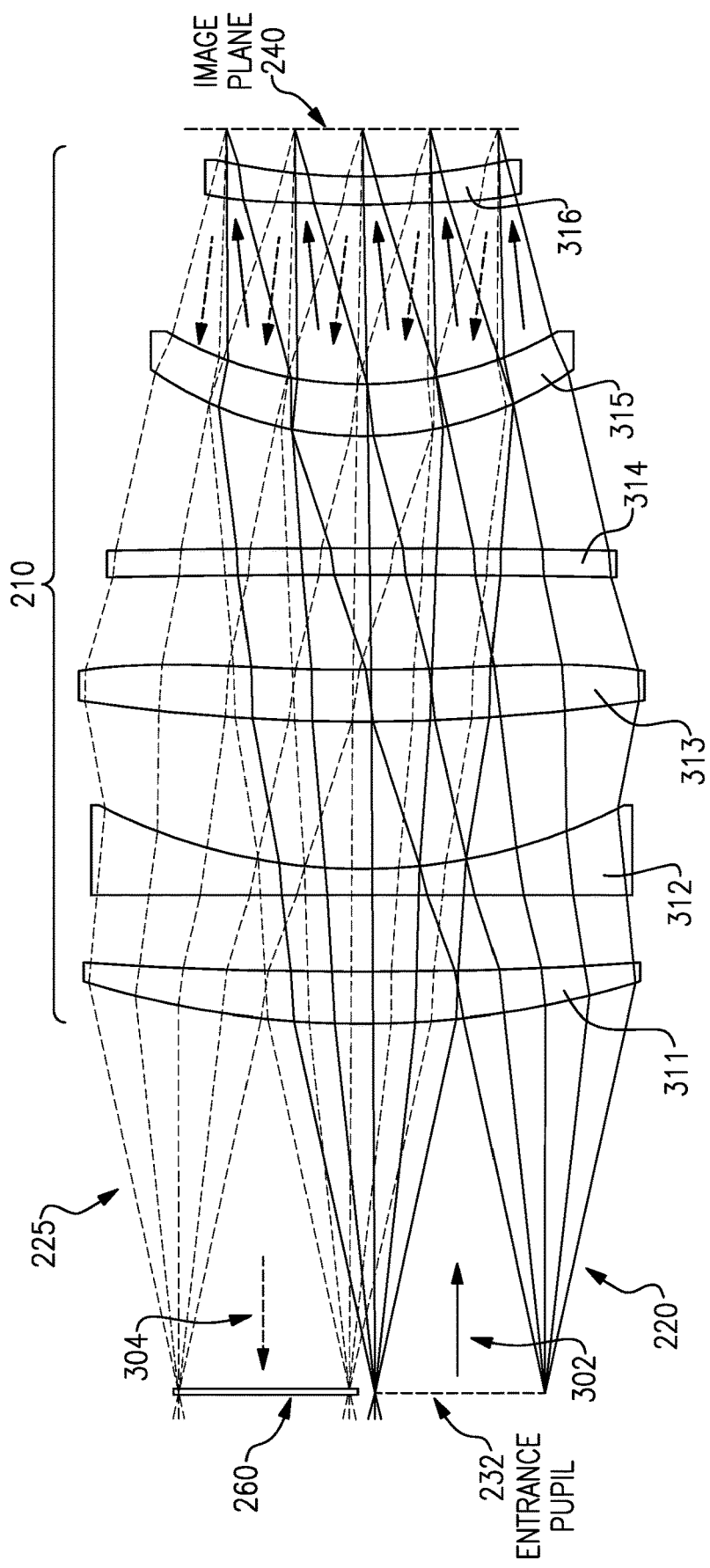
FIG. 3A is a ray trace of one example of a refractive imager according to aspects of the present invention.
Figure 3B:
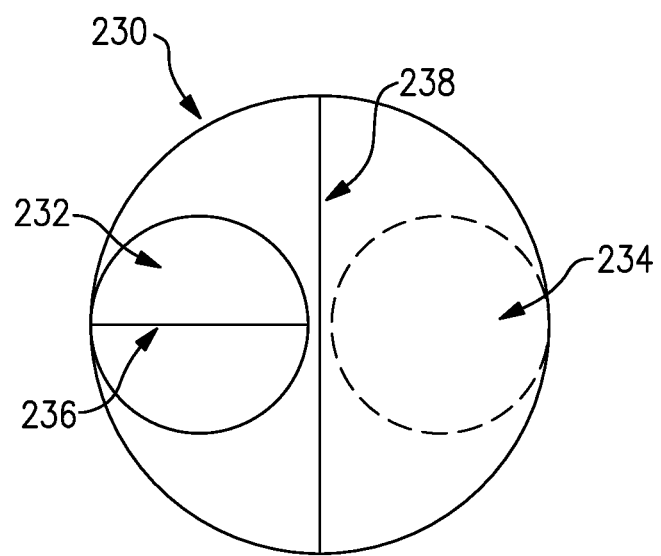
FIG. 3B is a diagram showing a representation of the aperture of the refractive imager of FIG. 3A according to aspects of the present invention.

FIGS. 3A and 3B illustrate an example of the refractive optics 210 having the above-discussed features and configuration. FIG. 3A is a side view showing a partial ray trace of an example of the refractive optics 210, and FIG. 3B is a plan view of the corresponding entrance aperture 230. As shown in FIGS. 3A and 3B, the operational aperture 232, through which the optical radiation 220 to be imaged is received has a diameter 236 that is less than half of the diameter 238 of the entrance aperture 230 and is offset to one side of the entrance aperture 230 by more than the radius of the entrance aperture 230. Referring to FIG. 3A, the optical radiation 220 is received via the operational aperture 232, as indicated by arrow 302, and focused by the refractive optics 210 onto the focal plane 240. The surface reflections, or specular return 225, from the imaging detector 250 located at the focal plane 240 travel back through the refractive optics 210, as indicated by arrow 304, and are directed to the blocking component 260. In the example shown in FIG. 3A, the refractive optics 210 includes six lenses 311, 312, 313, 314, 315, and 316. The lenses 311, 312, 313, 314, 315, and 316 are rotationally symmetric about an optical axis that bisects the entrance aperture 230. As discussed above, the optical form of the refractive optics 210 may have many different configurations and therefore the example shown in FIG. 3A is intended to be illustrative only (to demonstrate the ray paths of the received optical radiation 220 and the specular return 225 through the refractive optics 210) and non-limiting.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, it is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. The term optical radiation refers generally to an electromagnetic signal that propagates through a given medium, and is not meant to imply any particular characteristic of the light, such as frequency or wavelength, band, coherency, spectral density, quality factor, etc., and may include infrared, visible, and/or ultraviolet electromagnetic radiation, or other non-ionizing electromagnetic radiation conventionally processed in the field of optics.

Accordingly, the foregoing description and drawings are by way of example only, and the scope of the invention should be determined from proper construction of the appended claims, and their equivalents.

What is claimed is:

1. A refractive optical imaging system comprising:
   refractive optics having an entrance aperture and configured to receive optical radiation via an operational aperture, to focus the optical radiation onto a focal plane to form an image plane co-located with the focal plane, the operational aperture being co-located with the entrance aperture, having a diameter less than half a diameter of the entrance aperture, and being offset from a primary optical axis that bisects the entrance aperture by at least a radius of the entrance aperture;
   an imaging detector disposed at the focal plane and configured to receive the optical radiation; and
   a blocking component located at the entrance aperture in a region of the entrance aperture not occupied the by the operational aperture, the blocking component being configured to absorb surface reflections from the imaging detector.

2. The refractive optical imaging system of claim 1 wherein the blocking component is located on an opposite side of the primary optical axis from the operational aperture.

3. The refractive optical imaging system of claim 1 wherein the blocking component includes an absorptive coating.

4. The refractive optical imaging system of claim 3 wherein the absorptive coating is black paint.

5. The refractive optical imaging system of claim 1 wherein the refractive optics are corrected for aberrations over a field of view corresponding to the entrance aperture.

6. The refractive optical imaging system of claim 1 wherein the blocking component is further configured to block the optical radiation from entering the refractive optics via the region of the entrance aperture where the blocking component is located.

7. The refractive optical imaging system of claim 1 wherein the refractive optics are rotationally symmetric about the primary optical axis.

8. An optical imaging apparatus comprising:
   refractive optics having an entrance aperture and configured to receive optical radiation via an operational aperture, to focus the optical radiation onto a focal plane to form an image plane co-located with the focal plane, the operational aperture being co-located with the entrance aperture, having a diameter less than half a diameter of the entrance aperture, and being offset from a primary optical axis that bisects the entrance aperture by at least a radius of the entrance aperture, the refractive optics being rotationally symmetric about the primary optical axis; and
   a blocking component located at the entrance aperture on an opposite side of the primary optical axis from the operational aperture, the blocking component being configured to block the optical radiation from exiting the refractive optics via a region of the entrance aperture where the blocking component is located.

9. The optical imaging apparatus of claim 8 further comprising:
   an imaging detector located at the focal plane and configured to receive the optical radiation.

10. The optical imaging apparatus of claim 9 wherein the blocking component is configured to block a specular return from the imaging detector from exiting the entrance aperture.

11. The optical imaging apparatus of claim 8 wherein the blocking component includes an optically absorptive coating.

12. The refractive optical imaging apparatus of claim 11 wherein the optically absorptive coating is black paint.

13. The refractive optical imaging apparatus of claim 8 wherein the refractive optics are corrected for aberrations over a field of view corresponding to the entrance aperture.

* * * * *